United States Patent [19]

Zimmern

[11] 4,261,169
[45] Apr. 14, 1981

[54] METHOD FOR CONVERTING THERMAL ENERGY INTO MECHANICAL ENERGY AND A MACHINE FOR CARRYING OUT SAID METHOD

[75] Inventor: Bernard Zimmern, Neuilly sur Seine, France

[73] Assignee: Uniscrew Ltd., Hamilton, Bermuda

[21] Appl. No.: 943,993

[22] Filed: Sep. 20, 1978

[30] Foreign Application Priority Data

Sep. 28, 1977 [FR] France .............................. 77 29111

[51] Int. Cl.³ .............................................. F02C 3/055
[52] U.S. Cl. ................................. 60/39.05; 60/39.45; 60/728
[58] Field of Search ................. 60/39.05, 39.08, 39.45, 60/39.53, 39.67, 728; 418/85

[56] References Cited

U.S. PATENT DOCUMENTS

| | | | |
|---|---|---|---|
| 2,627,162 | 2/1953 | Nilsson et al. ......................... | 60/39.45 |
| 2,782,596 | 2/1957 | Lindhagen et al. .................. | 60/39.45 |
| 3,238,719 | 3/1966 | Harslem ................................ | 60/39.55 |
| 3,657,879 | 4/1972 | Ewbank et al. ...................... | 60/39.05 |

FOREIGN PATENT DOCUMENTS 7039346  9/1971  France . .

Primary Examiner—Louis J. Casaregola
Attorney, Agent, or Firm—Finnegan, Henderson, Farabow, Garrett & Dunner

[57] ABSTRACT

The method of energy conversion consists in burning a fuel in an oxidizing gas in order to admit the combustion gases into an expansion machine for delivering mechanical energy, in previously compressing the oxidizing gas in a positive-displacement compressor driven by the expansion machine, in injecting into the compressor a sealing and/or lubricating auxiliary liquid which is continuously cooled and separated from the compressed gas, then re-injected into the compressor. The auxiliary liquid is cooled by vaporization of water and the steam produced is entrained in the stream of compressed oxidizing gas.

7 Claims, 2 Drawing Figures

METHOD FOR CONVERTING THERMAL ENERGY INTO MECHANICAL ENERGY AND A MACHINE FOR CARRYING OUT SAID METHOD

This invention relates to a method for converting thermal energy into mechanical energy by burning a fuel in an oxidizing gas (especially air) in order to admit the combustion gases into an expansion machine which delivers the mechanical energy. In more precise terms, the invention is concerned with the case in which the oxidizing gas is compressed beforehand in a compressor which is driven by the expansion machine.

The invention is also directed to a machine for the practical application of the method under consideration.

In the following description, the term "expansion unit" will be used to designate the expansion machine and the term "driving unit" will be used to designate the assembly which is constituted by a compressor, an expansion machine, the combustion chamber, and in which at least the compressor is of the positive-displacement type.

In devices of this type, it is a known practice to employ a positive-displacement rotary compressor in which provision is made for injection of auxiliary liquid which is intended to ensure cooling, sealing and lubrication of the moving parts. This auxiliary liquid can be oil or even the fuel burnt in the combustion chamber and is usually separated from the compressed gas within a separator, then cooled and re-injected into the compressor.

The expansion unit can be of the dynamic type or also of the positive-displacement type and can be mounted on the same shaft as the compressor or connected to this latter through gears.

The compression ratio to be adopted in order to meet the requirement of acceptable thermodynamic efficiencies results in end-of-compression temperatures of several hundred degrees centigrade which are unacceptable in rotary compressors. Furthermore, a high temperature of the compressor introduces a substantial temperature rise of the indrawn air which impairs the efficiency of the cycle. It therefore proves necessary to cool the auxiliary liquid which circulates within the compressor. However, if cooling is carried out by removal of heat by the surrounding air or by an external circulation of water, this results in a thermodynamic loss which reduces the efficiency of the cycle.

The aim of the present invention is to provide a method of energy conversion in which cooling of the auxiliary liquid is carried out without producing a reduction in efficiency of the cycle.

According to a first aspect of the invention, the method for converting thermal energy into mechanical energy consists in burning a fuel in an oxidizing gas in order to admit the combustion gases into an expansion machine for delivering the mechanical energy, in previously compressing the oxidizing gas in a positive-displacement compressor driven by the expansion machine aforesaid, in injecting into said compressor a sealing and/or lubricating auxiliary liquid which is continuously cooled and separated from the compressed gas then re-injected into the compressor. The method essentially consists in cooling the auxiliary liquid by vaporization of water and in entraining the steam produced in the stream of compressed oxidizing gas.

It has in fact been found that, over a fairly wide range of compression ratios between 4 and 12, the temperature at which the compressed gases were saturated with steam while carrying away the entire quantity of compression heat (including the heat derived from losses in compressor efficiency) was located within a range of 110° to 160° C. approximately, these temperatures being acceptable in the case of materials of the type usually employed.

It has also been found that, when reasonable values of efficiency of the expansion unit and ancillaries were adopted, the ideal compression ratio was in the vicinity of 10.

Under these conditions, cooling of the compressor by injection of water after discharge makes it possible to retain the compression energy within the compressed mixture while lowering the termperature of the compressor to a very appreciable extent.

By reason on the one hand of the reduction in temperature and on the other hand of the presence of an increased weight of steam in the gas to be burnt, the cooling action has the further effect of producing a considerable reduction in the formation of nitrogen oxides at the moment of combustion if this latter is stoichiometric and, in a general manner, of reducing thermal problems at the level of the combustion chamber and of the expansion chamber.

In a preferential embodiment of the method and in order to dispense with the need to add water continuously within the system, the exhaust gases are cooled to a sufficiently low temperature to ensure that, at the exhaust pressure, the water contained in the form of steam after separation of the droplets is substantially equal by weight to the steam produced by the combustion of fuel.

According to a second aspect of the invention, the external-combustion driving machine comprises a positive-displacement compressor for compressing an oxidizing gas, a combustion chamber for burning a fuel in the compressed oxidizing gas, and an expansion machine for receiving the combustion gases and producing mechanical energy. The compressor comprises a sealing and/or lubricating auxiliary liquid and the machine comprises means for separating the auxiliary liquid from the compressed gas, means for re-injecting the auxiliary liquid into the compressor and means for cooling the auxiliary liquid.

The driving machine is characterized in that the means for cooling the auxiliary liquid comprise means for putting the water into contact with the auxiliary liquid and for entraining the steam formed in the stream of compressed oxidizing gas.

Further properties and advantages of the invention will become apparent from the detailed description which now follows, reference being made to the accompanying drawings which are given by way of example and not in any limiting sense, and wherein.

Figure 1:
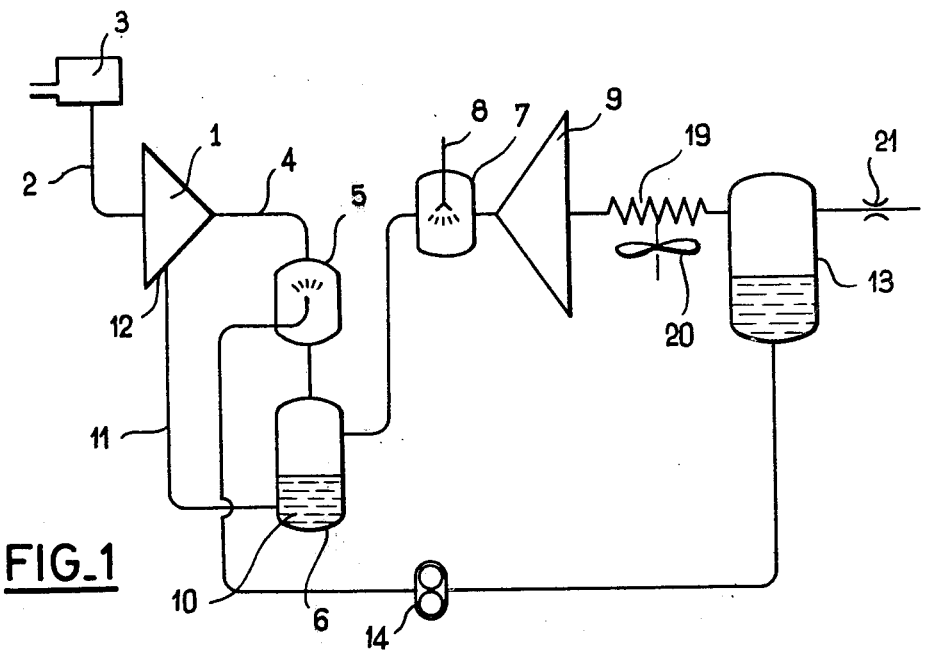
FIG. 1 is a diagram showing the circulations of air, of auxiliary liquid, of burnt gases and of water in accordance with the invention.

Reference being made to FIG. 1, the suction side of a compressor 1 is connected by means of a pipe 2 to an air filter 3 and the discharge side is connected by means of a pipe 4 to a chamber 5 followed by a separating tank 6, a combustion chamber 7 into which a fuel is discharged in spray form through an injector 8 and ignited at the time of startup by means of a spark plug (not shown). The combustion chamber 7 is connected to the inlet of an expansion unit 9. An auxiliary liquid shown at 10 is contained within the separating tank 6; this liquid can be oil or even fuel if it has sufficiently good lubricating properties as is the case with fuel-oil.

The liquid aforesaid is injected into the compressor at 12 through a pipe 11; this injection carries out sealing, cooling and lubrication of the compressor in a known manner.

Said liquid is discharged together with the compressed air and separated from this latter under the action of gravity within the tank 6, other known separating means such as a centrifuge, coalescing filters and so forth being also employed if necessary.

There is carried out within the chamber 5 a spary discharge of water supplied from an external source such as a storage tank 13 in the example which is shown in the drawings and the design function of which will be explained hereinafter. The water is injected by means of a pump 14. It is readily apparent that the compressor 1 is driven in rotation by the expansion unit 9 either by direct coupling or through gears, the residual mechanical energy being extracted from the shaft of either the compressor or the expansion unit in order to be delivered to the utilization system.

The intended function of the water injection is as follows: the mixture of compressed air and of auxiliary liquid vaporizes the water and is cooled.

It is worthy of note that this cooling process takes place without any appreciable loss of energy as indicated by complete thermodynamic calculations since the loss of volume of the gas at constant pressure as a result of cooling is substantially compensated by the formation of a substantially equivalent volume of steam.

It is a remarkable fact that this makes it possible in the first place to maintain the temperature of the auxiliary liquid and of the compressor at values which are compatible with conventional materials and especially plastics; thus in the case of compression ratios between 4 and 12 corresponding to the practical range of utilization, the temperature of equilibrium at which the compression energy is capable of being absorbed by the heat removed in the gas and in the steam in the saturated state varies substantially between 110° C. and 160° C.

By way of example and in the case of a compressor having a volumetric compression ratio of 10 and a compression efficiency of 0.73, said temperature of equilibrium is 156° C. whereas it would rise to the vicinity of 500° C. without cooling by injection of water. In this example, the mass of injected water is approximately 200 grams per kilogram of indrawn and compressed air.

Although it is known to construct rotary compressors and especially single-screw compressors which operate with satisfactory efficiencies at temperatures of 150° C., it is not known to obtain acceptable efficiencies at 500° C. on the one hand by reason of the thermal distortions which appear in complex profiles and on the other hand by reason of the rise in temperature of the indrawn gas which considerably impairs the thermodynamic balance.

Furthermore, the water injection introduces the accessory advantage of reducing the temperature of the combustion chamber since it reduces this temperature by approximately 350° C. and the steam contained in the gas also reduces the temperature rise; coupled with the fact that the combustion takes place at constant pressure, the termperature even in the vicinity of stoichiometry is distinctly lower than the temperature attained in the combustion of a piston engine or of a Diesel engine and is in the vicinity of 1800° C. This is the limit beyond which nitrogen oxides are formed in appreciable quantities and it is known that these pollutants are among the most difficult to eliminate. A cycle having excellent thermodynamic efficiency is thus ensured since it is close to stoichiometry and at a high compression ratio without the disadvantages which arise from the formation of nitrogen oxides.

In the embodiment which is illustrated in FIG. 1, a conventional temperature probe (not shown) serves to measure the temperature of the liquid which flows within the pipe 11 and automatically modifies the rate of flow of injected water, for example by producing action on the pump 14.

The invention would clearly not be modified if the probe were to measure the temperature of the compressed air at any given point of the circuit between the outlet of the compressor and the combustion chamber or if other equivalent conventional regulating devices were employed.

Figure 2:
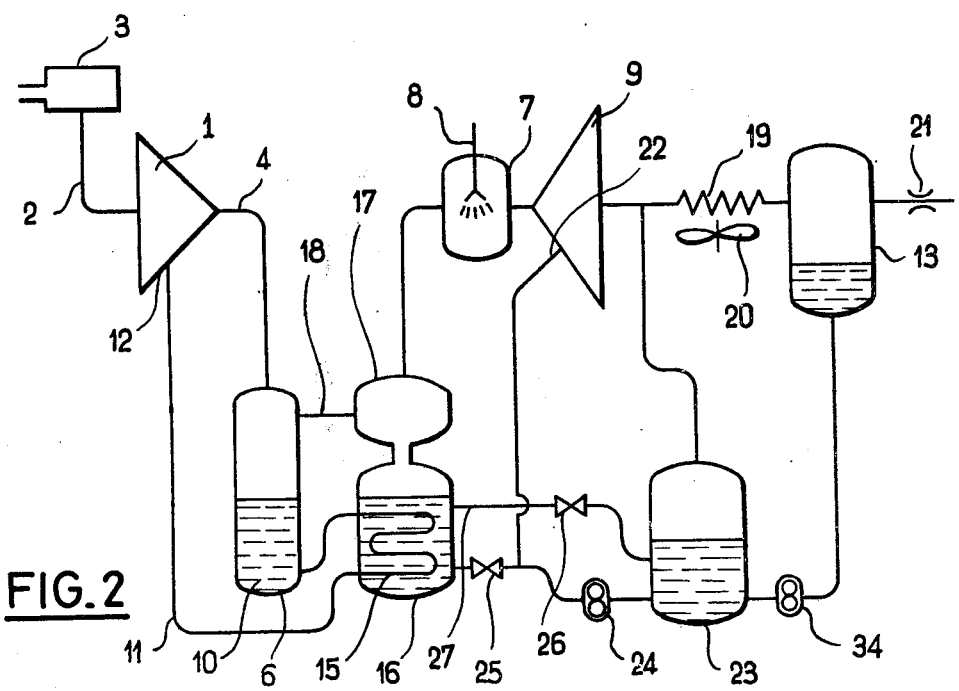
FIG. 2 is a diagram showing a preferential alternative form of FIG. 1.

There is illustrated in FIG. 2 an arrangement in which this regulation is suppressed and the injection chamber is dispensed with. In this arrangement, the auxiliary liquid leaves the separating tank 6, flows through pipes 15 which form a heat exchanger and are placed within a tank 16 which is partly filled with water. The compressed air supplied from the tank 6 is passed through the pipe 18 to the upper portion 17 of said tank 16.

Said compressed air is saturated with steam under conditions of thermal equilibrium which are substantially identical with the conditions described earlier.

Referring to FIG. 1, a heat exchanger 19 is ventilated by the surrounding air by means of a fan 20 and terminates in a tank 13; the heat exchanger is designed to cool the expanded gases to a temperature such that the saturated steam contained therein is substantially equal by weight to the steam formed by the combustion.

It is in fact known that the combustion of hydrocarbons gives rise to the formation of steam; thus in the case of ordinary hydrocarbons, the quantity of steam formed is substantially equal to the quantity which is necessary in order to saturate the expended gases at approximately 60° C. at atmospheric pressure, and at approximately 80° C. at 1 bar (effective pressure).

By way of example, it is therefore possible to provide a constriction or throat 21 on the discharge side such that the pressure within the tank 13 is 1 bar (effective) at full operating speed and to design the heat exchanger 19 with dimensions such that the outlet temperature of this latter is approximately 80° C.; at a partial operating speed, the outlet pressure decreases but the flow to be cooled also decreases at the same time, with the result that the temperature falls and the quantity of steam in the exhaust gases remains substantially the same by weight per kilogram of gas.

It should be noted that a temperature of 80° C. entails the need for only a moderate increase in size of the heat exchangers with which the engines of motor vehicles are usually equipped and which normally operate in the vicinity of 100° C.

A further point worth noting is that this temperature of 80° C. could be high if ordinary fuels were replaced by fuels having a lower carbon content and a higher hydrogen content as can be expected in the long term.

There is shown in FIG. 2 an alternative embodiment in which the expansion unit 9 is of the positive-displacement type and provided with a water injection 22. This water performs the function of auxiliary liquid and is intended in known manner to ensure cooling of the expansion unit as disclosed, for example, in U.S. Pat. No. 3,181,296. At the outlet of the expansion unit, said water is separated under the action of gravity, for example, and passed into a tank 23. Only the gases which are saturated with water then pass into the heat exchanger 19 and are separated from the droplets condensed within the tank 13; a pump 34 recirculates the separated liquid and passes this latter into the tank 23. From the tank 23, a pump 24 feeds the water under pressure to the injection 22. A valve 25 is branched-off the outlet of the pump 24 and serves to restore the level within the tank 16. Said valve is controlled, for example, by a float placed within the tank 16.

There is also shown a valve 26 mounted in a pipe 27 which provides a connection between the tanks 16 and 23. During periods of cold weather, it may in fact prove necessary to prevent freezing of the water by introducing an additive such as glycol. In order to prevent an excessive concentration of glycol within the boiler 16, a small fraction is continuously returned to the tank 23 and its rate of flow is controlled by the valve 26.

It should be noted that the water under pressure downstream of the pump 24 can be employed for cooling the walls of stationary portions such as the combustion chamber or the casing of the expansion unit 9 and that this cooling action can take place by vaporization of the water. The steam can be fed into the combustion chamber and expanded with the gases.

In practice, the pressures obtained with volumetric compression ratios of 10 are of the order of 20 bar. This corresponds to boiling temperatures of the water of approximately 220° C., these temperatures being wholly acceptable for the walls of a combustion chamber or of a fixed casing.

The result thereby achieved is, in the first place, a substantial recovery of the energy which is usually lost through the walls in machines of known types and, in the second place, a further reduction in the maximum temperature of burnt gases.

I claim:

1. A method for converting thermal energy into mechanical energy which comprises burning a fuel in an oxidizing gas in order to admit the combustion gases into an expansion machine for delivering the mechanical energy; previously compressing the oxidizing gas in a positive-displacement compressor driven by the expansion machine aforesaid; injecting into said compressor a sealing and/or lubricating auxiliary liquid which is entrained in the compressed oxidizing gas and is subsequently separated from the compressed gas then reinjected into the compressor; and in cooling said auxiliary liquid by vaporizing water to produce steam using heat values transferred from said auxiliary liquid, said cooling step being carried out in an area downstream of said compressor; and wherein the method further comprises entraining the steam produced in the stream of compressed oxidizing gas.

2. A method according to claim 1, wherein the method further includes the step of regulating the rate of flow of water to obtain a predetermined constant temperature of the auxiliary liquid, said regulating step utilizing flow control means responsive to the actual temperature of said auxiliary liquid.

3. A method according to claim 1 in which the combustion is carried out in stoichiometric proportions, wherein the method further includes extracting a quantity of water from the combustion gases such that there only remains in the exhaust gases a second quantity of water equal to that which is produced by combustion.

4. The method as in claim 1 wherein the cooling step includes the step of directly contacting the auxiliary liquid with a flow of said water to be vaporized, said contacting step occurring before separation of the entrained auxiliary liquid.

5. The method as in claim 4 wherein said directly contacting step further includes the step of spraying water into a chamber containing the compressed oxidizing gas and entrained auxiliary liquid.

6. The method as in claim 1 wherein the cooling step includes the step of indirectly contacting said auxiliary liquid with said water to be vaporized in heat exchanger means, said indirectly contacting step occurring after separation of the auxiliary liquid.

7. The method as in claim 6 further including the steps of separating said auxiliary liquid from said compressed oxidizing gas in a first chamber, flowing said separated auxiliary fluid through said heat exchanger means, said heat exchanger means being in heat transfer connection with the water to be vaporized in a second chamber, and admitting the stream produced in said second chamber to said compressed oxidizing gas downstream of said first chamber.

* * * * *